United States Patent
Bravo

[11] Patent Number: 6,053,539
[45] Date of Patent: Apr. 25, 2000

[54] SWIVEL FITTING

[76] Inventor: Sergio M. Bravo, 2872 Tigertail Dr., Los Alamitos, Calif. 90720

[21] Appl. No.: 09/236,501

[22] Filed: Jan. 25, 1999

[51] Int. Cl.[7] ............................................. F16L 27/08
[52] U.S. Cl. ..................... 285/276; 285/39; 285/148.15; 285/148.19; 285/276; 285/281; 285/404
[58] Field of Search ................................ 285/272, 276, 285/279, 281, 39, 404, 148.19, 148.15

[56] References Cited

U.S. PATENT DOCUMENTS

| | | | |
|---|---|---|---|
| 456,756 | 7/1891 | Bastian | 285/276 |
| 1,366,634 | 1/1921 | Clark | 285/276 |
| 2,396,123 | 3/1946 | Phillips | 285/276 |
| 2,458,714 | 1/1949 | Mahoney | 285/97.3 |
| 2,518,443 | 8/1950 | Bagnard | 285/97.3 |
| 2,587,170 | 2/1952 | Klingler et al. | 285/279 |
| 2,723,136 | 11/1955 | Deubler | 285/276 |
| 2,745,682 | 5/1956 | Chevallier | 285/276 |
| 3,148,922 | 9/1964 | Roessler, Jr. | 308/198 |
| 3,186,737 | 6/1965 | Brundage | 285/45 |
| 3,484,853 | 12/1969 | Nishi | 285/279 |
| 3,900,221 | 8/1975 | Fouts | 285/276 |
| 4,120,520 | 10/1978 | Ahlstone | 285/18 |
| 4,260,183 | 4/1981 | Krupp | 285/276 |
| 4,749,192 | 6/1988 | Howeth | 285/86 |
| 5,607,189 | 3/1997 | Howeth | 285/279 |
| 5,664,951 | 9/1997 | Clary et al. | 439/92 |

*Primary Examiner*—Dave W. Arola
*Attorney, Agent, or Firm*—Christie, Parker & Hale, LLP

[57] ABSTRACT

A swivel fitting is provided for use on the riser line associated with the underground storage tank of gasoline service stations. The swivel fitting includes an adapter sleeve that attaches to the riser line by a standard threaded connection. A swivel sleeve includes a fill adapter fitting for use in removably attaching a product transfer hose as is typically used to transfer product to the underground storage tank from a tanker truck. The swivel sleeve is sleeved to the adapter sleeve to permit rotation of the fill adapter fitting with respect to the riser line. A pair of bearing surfaces and a bearing between the swivel sleeve and the adapter sleeve allow smooth rotation of the swivel sleeve with respect to the adapter sleeve.

21 Claims, 2 Drawing Sheets

SWIVEL FITTING

FIELD OF THE INVENTION

This invention is directed to a swivel fitting for the riser line used for transferring petroleum products to an underground product storage tank of the type found at gasoline service stations. The fitting permits a fuel hose to be removably attached to the riser line while permitting rotation of the hose during the transfer of product.

BACKGROUND OF THE INVENTION

Gasoline service stations typically include a number of underground storage tanks for storing fuel products. A conduit known as a riser line generally extends from each tank to a manhole at the driveway surface of the service station. By removing the manhole cover and a cap from the top of the riser, a hose can be connected to the riser line to fill the product tank with petroleum products delivered by tanker trucks. The hose is generally connected to the riser line using a connector known as a top seal delivery nozzle. Such nozzles allow the hose to be quickly connected and disconnected from the riser line at a fill adapter located on the top of the riser line to simplify product transfer. These fill adapters are typically threaded to the riser line which is in turn threaded into a collar on the top of its respective product tank. When the underground storage tank is not being filled, a removable cap is used to seal the fill adapter both to prevent contaminants from entering the product tank and to prevent hydrocarbon vapors from escaping from the tank.

One problem with the use of conventional top seal delivery nozzles is that while no twisting is required to fasten the nozzle to the fill adapter, during the transfer of product, especially at the end of the product transfer when the hose is lifted and drained of any remaining product, some twisting of the nozzle occurs. Such twisting of the hose can cause twisting of the fill adapter, loosening it from the riser line. To prevent such loosening of the fill adapter from the riser line, fill adapters are often equipped with set screws which lock them to the riser line. While such a practice prevents the fill adapter from loosening from the riser, it can cause twisting of the entire riser. This can sometimes cause the riser to loosen from the tank collar. The loosening of any of the fittings or connectors on the riser line is to be avoided as it can lead to product or vapor leakage, or product contamination.

At least one known swivel fitting has been developed for fill adapters to permit rotation of the nozzle with respect to the riser line without causing any loosening of either the connection between the fill adapter and riser line, or the riser line and underground storage tank. One such fitting is sold by OPW Fueling Components of Cincinnati, Ohio, and is illustrated in U.S. Pat. No. 5,664,951.

SUMMARY OF THE INVENTION

An improved swivel fitting is disclosed which permits a typical top seal delivery nozzle to freely rotate with respect to the riser line associated with an underground product storage tank. This simplifies the transfer of product from the tanker to the product tank by permitting some twisting of the transfer hose. Such twisting is permitted without causing any loosening of the fittings associated with the riser line as can be experienced when rigid connections are used.

The swivel fitting includes an adapter sleeve and a swivel sleeve. The adapter sleeve is of a generally tubular construction with a first internally threaded end for attachment to the top of a typical riser line. An inner lip is provided above the thread of the first end as a seat for a gasket. The gasket seals the adapter sleeve to the riser line. A second end of the adapter sleeve includes an upper lip which defines a first bearing support surface. Inside the adapter sleeve and intermediate the first and second ends of the adapter sleeve, an inner lip is provided.

The swivel sleeve is also of a generally tubular construction and includes a first end which defines a fill adapter to which a product hose can be removably attached by its nozzle. A second end of the swivel sleeve is sleeved into the second end of the adapter sleeve. The outer wall of the second end of the swivel sleeve defines a pair of circumferential grooves into which a pair of O-rings fit to seal the swivel sleeve to the adapter sleeve. An outer circumferential lip is provided on the outer wall of the swivel sleeve between the circumferential grooves and the fill adapter to provide a second bearing support surface.

A bearing is provided between the first bearing support surface of the adapter sleeve and the second bearing support surface of the swivel sleeve to permit rotation of the swivel sleeve with respect to the adapter sleeve. The bearing comprises a pair of bearing rings, each with a trough which forms a circumferential track for receiving a plurality of ball bearings between the bearing rings. A wave spring is provided between the first bearing support surface and the bearing to bias the bearing rings against the ball bearings, thereby holding the ball bearings within the track. A fastener such as a retaining ring is removably inserted into a third circumferential groove of the outer wall of the second end of the swivel sleeve to hold the assembly together. The retaining ring abuts against the inner lip of the adapter sleeve and holds the adapter sleeve and swivel sleeve in engagement with one another while permitting rotation of the two with respect to one another.

DESCRIPTION OF THE DRAWINGS

Other features, aspects and advantages of the present invention will be fully understood when considered with respect to the following detailed description, appended claims, and accompanying drawings where:

DETAILED DESCRIPTION OF THE INVENTION

Figure 1:
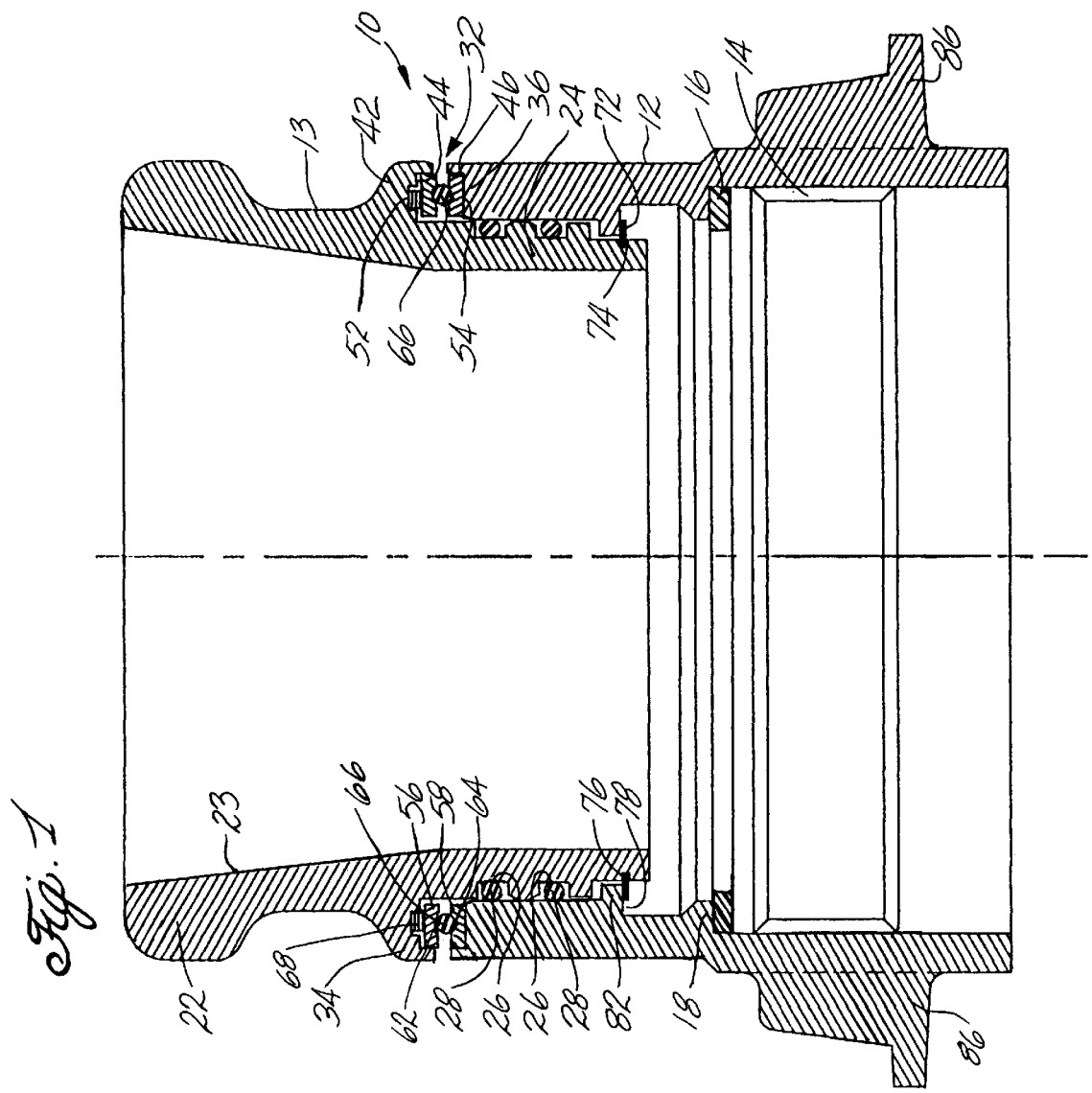
FIG. 1 is an elevation view in section of a swivel fitting of the present invention.

Referring to FIG. 1 a swivel fitting 10 of the present invention is illustrated. The swivel fitting generally includes an adapter sleeve 12 and a swivel sleeve 13. The adapter sleeve is of a generally tubular construction and anchors the swivel fitting to a riser line (not shown.) Preferably, the adapter sleeve is threaded to the male threaded end of a conventional riser line by an internally threaded female connector 14 on its lower end. A gasket 16 made of an elastomeric material is preferably provided between the riser line and a first inner lip 18 on the inner wall of the adapter sleeve above the internal thread of the female connector to seal the connection between the adapter sleeve and the riser line.

While the use of a threaded connection and gasket between the adapter sleeve and riser line is generally preferred, the adapter sleeve could be sealed to the riser line using a tapered pipe thread in combination with pipe dope or other conventional threaded pipe sealing material. Similarly, the adapter sleeve could be attached to the riser line by a flanged fitting or any number of other pipe connections as are well known in the art. If desired, the adapter sleeve could even be more permanently attached to the riser line such as by welding.

The swivel sleeve is also of a generally tubular construction with a top section that includes an upper fitting or fill adapter 22 of the type well known in the industry. Such fill adapters are well known in the art for providing a convenient means of connecting a product delivery hose to a riser line during transfer of product from a tanker truck to the underground storage tank. Such fill adapters permit quick connection and disconnection of the nozzle of the delivery hose to the riser line. To improve flow through the fill adapter, a tapered inner wall 23 is provided on the fill adapter.

Opposite the fill adapter at a lower end of the swivel fitting is a sealing sleeve 24 for insertion into the adapter sleeve. The outer wall of the sealing sleeve includes a pair of circumferential sealing grooves 26 for receiving a pair of gaskets, preferably O-rings 28. The gaskets seal the outer wall of the sealing sleeve to the inner wall of the adapter sleeve. In the preferred embodiment, the O-rings are coated with TEFLON® to reduce friction. Such TEFLON®-coated O-rings are manufactured by M-Cor, Inc. of Wood Dale, Ill. and are sold under the name NCAP-O-SEAL™. It is preferred to use two gaskets to prevent the adapter sleeve and the swivel sleeve from wobbling with respect to one another.

In order to further permit the adapter sleeve and swivel sleeve to easily rotate with respect to one another, a bearing 32 is provided between the two. The bearing is sandwiched between an upper bearing support surface 34 of the swivel sleeve and a lower bearing support surface 36 of the adapter sleeve. The upper bearing support surface is preferably provided as a circumferential lip 42 located on the outer wall of the sealing sleeve above the sealing grooves and includes a lower face 44. The lower bearing support surface is provided as an upper lip 46 of the adapter sleeve. First and second channels 52, 54 defined by the upper and lower bearing support surfaces provide seats for receiving upper and lower bearing rings 56, 58. First and second semicircular troughs 62, 64 run circumferentially around the lower surface of the upper bearing ring and the upper surface of the lower bearing ring, respectively, together forming a track for retaining a plurality of ball bearings 66 which reduce the friction associated with any rotation between the swivel sleeve and the adapter sleeve. Preferably the bearing rings and ball bearings are packed with a lubricant such as packing grease to maintain their smooth operation over a long period of time.

In order to keep the bearing rings in contact with the ball bearings, a spring 68 is provided in the first channel between the circumferential channel of the upper lip and the upper bearing ring. The spring biases the swivel sleeve away from the adapter sleeve slightly, thereby biasing the upper bearing ring in a downward direction and holding the ball bearings between the bearing rings. Preferably, the spring is provided as a wave spring. Such wave springs are known in the art and comprise a washer-shaped ring of springy material, preferably of a metal or metal alloy, having a generally wave shaped series of undulations running around its circumference, the undulations extending upwardly and downwardly from the plane generally defined by the ring. The presently preferred wave spring is one known as a SPIRAWAVE® wave spring manufactured by Smalley Steel Ring Co. Of Wheeling, Ill.

While the bearing is described as including a pair of bearing rings and a plurality of loose ball bearings, a bearing race of the type well known in the art could instead be used as could other bearings such as roller bearings. Similarly, while a wave spring is described as the preferred means for biasing the swivel sleeve and adapter sleeve away from one another, some other type of spring such as a coil spring, or even a ring of elastomeric material could perform the desired biasing function. Moreover, while the spring is disclosed as being placed between the upper bearing ring and the circumferential lip of the swivel sleeve, the spring could instead be placed elsewhere, such as between the lower bearing ring and the upper lip of the adapter sleeve.

In order to hold the assembly in place and prevent the bias imparted by the spring from separating the adapter sleeve from the swivel sleeve, a fastener such as a retaining ring 72 is provided. The retaining ring is provided on the lower end of the scaling sleeve, fitting into a circumferential groove 74 in the outer wall of the lower portion of the sealing sleeve. An upper face 76 of the retaining ring abuts against a lower face 78 of a second inner lip 82 provided on the inner wall of the adapter sleeve between the first inner lip and the upper lip. The spring is preferably biased to provide between about 5 and about 15 pounds of force between the adapter sleeve and swivel sleeve in order to keep the bearing surfaces engaged against the ball bearings.

Figure 2:
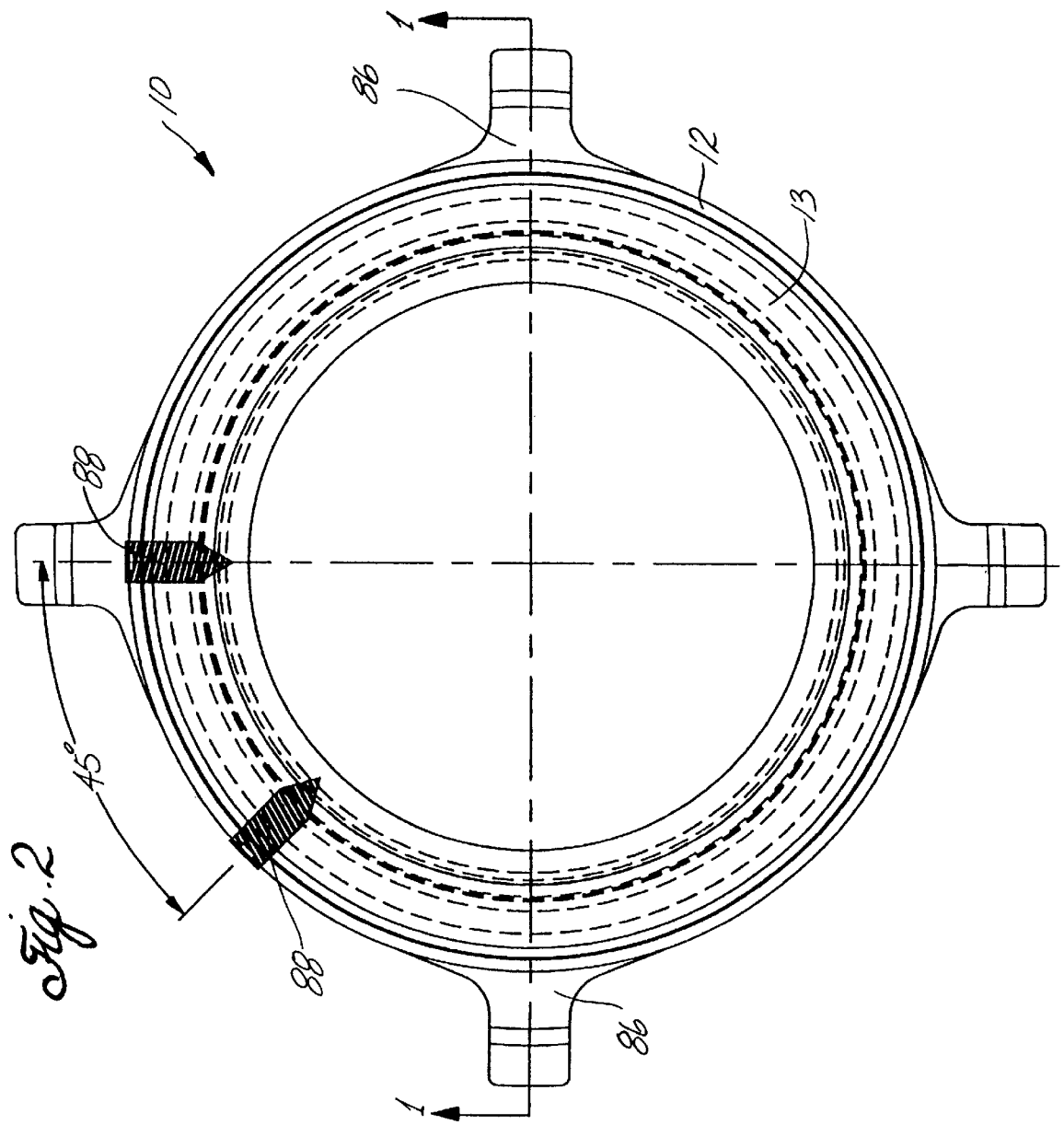
FIG. 2 is a plan view of the swivel fitting of FIG. 1.

In order to simplify the installation of a swivel fitting of the present invention to a threaded riser line, four ears 86 integral to the adapter sleeve can be provided as best seen in FIG. 2. A simple installation tool (not shown) comprising a horizontal handle with four downwardly extending arms can be easily fabricated and used to thread and tighten the swivel fitting to the riser line. Such a tool is slipped over the swivel fitting so that the arms abut against the ears of the adapter sleeve. The handle can then be turned to thread the swivel fitting onto the riser line. Removal of the swivel fitting can easily be done by rotating the handle of the tool in the opposite direction.

In the preferred embodiment, the swivel fitting is locked to the riser line by one or more sets screws 88. Such set screws extend through threaded holes in the outer wall of the adapter sleeve between the ears. Each set screw preferably has a pointed end which engages the threads of the riser line. It has been found that if two set screws are used they should not be provided opposing one another, but should both press on the same general side of the riser. This causes the swivel fitting to slightly tilt with respect to the riser line thereby skewing the threads slightly and locking the two to one another. Preferably two set screws are provided at about 45° from one another on the adapter sleeve.

The swivel fitting of the present invention is preferably constructed of a durable metal or metal alloy as is well known in the art. In the preferred embodiment, the adapter sleeve and swivel sleeve are constructed of bronze. Bronze is preferred for its desirable electrical grounding properties. For durability, the bearing rings and ball bearings are preferably constructed of stainless steel. The wave spring and set screws can similarly be constructed of stainless steel.

While the presently preferred embodiment of the invention has been disclosed, a number of variations would be apparent to one of ordinary skill in the art based on the above disclosure. One variation is that rather than sleeving the swivel sleeve within the adapter sleeve as illustrated, the swivel sleeve could be configured to extend around the adapter sleeve. However, the embodiment described is preferred as it provides improved leak prevention in the seal between the adapter sleeve and swivel sleeve. According to the embodiment disclosed, should one or both of the O-ring seals fail, any product flowing through the swivel fitting will tend to flow downward by gravity and will not generally seep into the gap between the adapter fitting and swivel fitting. Of course, if the two components were reversed some amount of product would tend to gravitate into this gap. If the O-rings were to fail, this could lead to product leakage.

Other changes in the form and detail of the preferred embodiment may similarly be made without departing from the spirit and scope of the invention which is intended to be defined by the following claims.

What is claimed is:

1. A swivel fitting for connecting a pipe to a removable hose fitting comprising:

an adapter sleeve comprising first and second ends, the first end including a first bearing support surface;

a swivel sleeve comprising a first end including a fill adapter for attachment to the hose fitting, a second bearing support surface, and a second end opposite the first end, whereby the first end of the adapter sleeve and the second end of the swivel sleeve are sleeved to one another;

a gasket for sealing the adapter sleeve and swivel sleeve to one another;

a bearing between the first and second bearing support surfaces to permit the swivel sleeve and the adapter sleeve to rotate with respect to one another;

a snap ring to hold the adapter sleeve and swivel sleeve engaged with one another; and a spring biasing the bearing between the first and second bearing support surfaces.

2. The swivel fitting of claim 1 wherein the spring comprises a wave spring between the bearing and one of the bearing support surface.

3. The swivel fitting of claim 1 wherein the bearing comprises a pair of bearing rings and a plurality of ball bearings.

4. The swivel fitting of claim 3 wherein the spring comprises a wave spring between one of the bearing rings and one of the bearing support surfaces.

5. The swivel fitting of claim 1 wherein the gasket comprises an O-ring.

6. The swivel fitting of claim 1 wherein the gasket comprises a pair of O-rings.

7. The swivel fitting of claim 1 further comprising a plurality of ears extending outwardly from the adapter sleeve.

8. A swivel fitting for connecting a pipe to a removable hose fitting comprising:

an adapter sleeve comprising first and second ends, the first end including an upper lip and the second end including means for attaching the adapter sleeve to the pipe;

a swivel sleeve comprising: a first end including a fill adapter for attachment to the hose fitting; a second end opposite the first end, whereby the first end of the adapter sleeve and the second end of the swivel sleeve are sleeved to one another; and a circumferential lip intermediate the first and second ends;

a gasket for sealing the adapter sleeve and swivel sleeve to one another;

a bearing between the upper lip of the adapter sleeve and the circumferential lip of the swivel sleeve comprising a pair of bearing rings and a plurality of ball bearings;

a fastener for holding the adapter sleeve and swivel sleeve engaged with one another; and a spring biasing the bearing between the upper lip of the adapter sleeve and the outer lip of the swivel sleeve.

9. The swivel fitting of claim 8 wherein the spring comprises a wave spring.

10. The swivel fitting of claim 8 wherein the gasket comprises an O-ring.

11. The swivel fitting of claim 8 wherein the fastener comprises a retaining ring.

12. The swivel fitting of claim 8 further comprising a plurality of ears extending outwardly from the adapter sleeve.

13. The swivel fitting of claim 8 wherein the means for attaching the adapter sleeve to the pipe comprises a threaded connection.

14. The swivel fitting of claim 13 wherein the means for attaching the adapter sleeve to the pipe further comprises a gasket.

15. A swivel fitting comprising:

a first tubular sleeve defining a conduit for the passage of fluid, the first tubular sleeve comprising a first end defining a first bearing support surface, a second end opposite the first end, and an inner wall defining a circumferential inner lip intermediate the first and second ends;

a second tubular sleeve defining a conduit for the passage of fluid, the second tubular sleeve comprising: a first end defining an outer wall sleeved into the second end of the first tubular sleeve and including a first outer circumferential groove; a circumferential outer lip opposite the first end and defining a second bearing support surface; and a second circumferential outer groove intermediate the first end and the outer lip;

a gasket placed in the second circumferential groove to provide a seal between the inner wall of the first tubular sleeve and the outer wall of the second tubular sleeve;

a bearing between the first and second bearing support surfaces comprising a first bearing ring associated with the first bearing support surface, a second bearing ring associated with the second bearing support surface, a plurality of ball bearings between the first and second bearing rings, and a spring for biasing at least one of the first or second bearing rings against the plurality of ball bearings; and a retaining ring removably inserted into the first circumferential groove of the first end of the second tubular sleeve, the retaining ring for abutting against the inner lip of the first tubular sleeve and holding the first tubular sleeve and second tubular sleeve in engagement with one another.

16. The swivel fitting of claim 15 wherein the gasket is an O-ring.

17. The swivel fitting of claim 15 further comprising a fill adapter for removable attachment of the swivel fitting to a fuel product hose nozzle.

18. The swivel fitting of claim 15 wherein the spring is a wave spring.

19. A swivel fitting for connecting a pipe to a removable hose fitting comprising:

an adapter sleeve comprising first and second ends, the first end including a first bearing support surface;

a swivel sleeve comprising a first end including a fill adapter for attachment to the hose fitting, a second bearing support surface, and a second end opposite the first end, whereby the first end of the adapter sleeve and the second end of the swivel sleeve are sleeved to one another;

a gasket for sealing the adapter sleeve and swivel sleeve to one another;

a bearing between the first and second bearing support surfaces to permit the swivel sleeve and the adapter sleeve to rotate with respect to one another;

a fastener to hold the adapter sleeve and swivel sleeve engaged with one another; and a wave spring between the bearing and one of the bearing support surface to bias the bearing between the first and second bearing support surfaces.

20. A swivel fitting for connecting a pipe to a removable hose fitting comprising:

an adapter sleeve comprising first and second ends, the first end including a first bearing support surface;

a swivel sleeve comprising a first end including a fill adapter for attachment to the hose fitting, a second bearing support surface, and a second end opposite the first end, whereby the first end of the adapter sleeve and the second end of the swivel sleeve are sleeved to one another;

a gasket for sealing the adapter sleeve and swivel sleeve to one another;

a bearing between the first and second bearing support surfaces to permit the swivel sleeve and the adapter sleeve to rotate with respect to one another, the bearing comprising a pair of bearing rings and a plurality of ball bearings;

a fastener to hold the adapter sleeve and swivel sleeve engaged with one another; and a spring biasing the bearing between the first and second bearing support surfaces.

21. A swivel fitting for connecting a pipe to a removable hose fitting comprising:

an adapter sleeve comprising first and second ends, the first end including an upper lip and the second end including means for attaching the adapter sleeve to the pipe;

a swivel sleeve comprising: a first end including a fill adapter tor attachment to the hose fitting; a second end opposite the first end, whereby the first end of the adapter sleeve and the second end of the swivel sleeve are sleeved to one another; and a circumferential lip intermediate the first and second ends;

a gasket for sealing the adapter sleeve and swivel sleeve to one another;

a bearing between the upper lip of the adapter sleeve and the circumferential lip of the swivel sleeve comprising a pair of bearing rings and a plurality of ball bearings;

a retaining ring to hold the adapter sleeve and swivel sleeve engaged with one another; and a spring biasing the bearing between the upper lip of the adapter sleeve and the outer lip of the swivel sleeve.

* * * * *